UNITED STATES PATENT OFFICE.

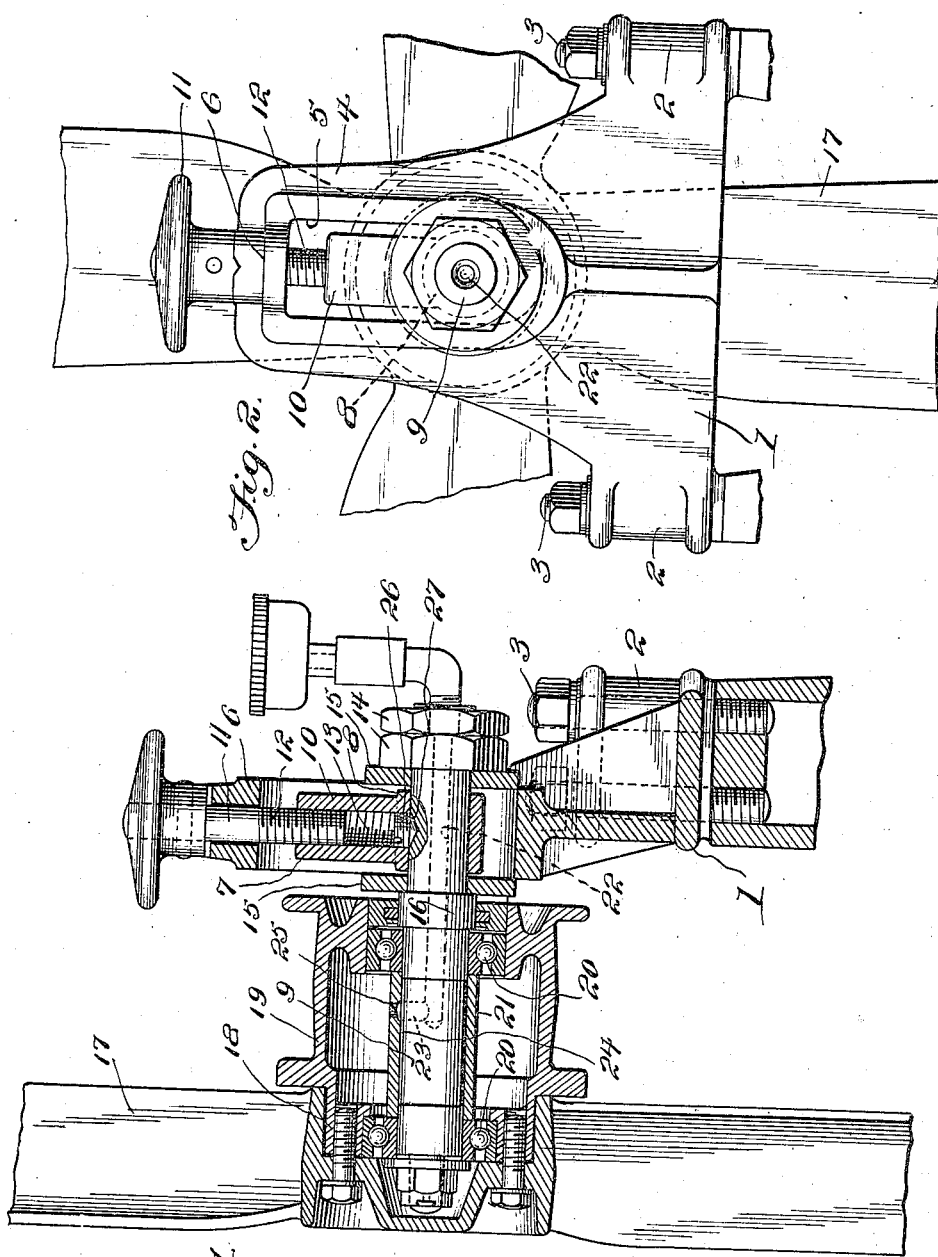

ALFONSO M. LEONI, OF PHILADELPHIA, PENNSYLVANIA, ASSIGNOR, BY MESNE ASSIGNMENTS, TO STEINMETZ ELECTRIC MOTOR CAR CORPORATION, OF BALTIMORE, MARYLAND, A CORPORATION OF MARYLAND.

FAN MOUNTING FOR MOTOR VEHICLES.

1,426,301.     Specification of Letters Patent.     Patented Aug. 15, 1922.

Application filed October 9, 1919. Serial No. 329,582.

*To all whom it may concern:*

Be it known that I, ALFONSO M. LEONI, a citizen of the United States, residing at Philadelphia, in the county of Philadelphia and State of Pennsylvania, have invented certain new and useful Improvements in Fan Mountings for Motor Vehicles, of which the following is a specification.

This invention relates to an improvement in fan mountings for motor-driven vehicles, being directed more particularly to a fan mounting wherein means are provided for adjusting the mounting to regulate the belt drive of the fan as required.

An accepted type of such mounting provides for the adjustment thereof through operation of a jack screw having threaded connection with an opening formed through the fan shaft. This type is open to several objections, particularly the decided weakening of the fan shaft incident to the jack-screw engaging opening formed therethrough.

The present invention avoids any weakening of the fan shaft, by mounting such shaft in a carrier, in which the shaft has full bearing and slidably operating such carrier relative to a supporting yoke, by means of a jack screw having threaded connection with the carrier beyond the fan shaft. This construction permits the necessary fan mounting adjustments while the fan is operating, and also adapts the mounting to a desirable method of lubrication impossible to the accepted type noted.

In the drawings:—

Fig. 1 is a vertical sectional view, showing the improved fan mounting.

Fig. 2 is an elevation of the same.

The improved fan mounting comprises a support or base 1, including a member adapted for connection to a convenient part of the vehicle frame or engine. As here shown, such base has spaced blocks 2, adapted to be bolted to the frame at 3.

Rising from and preferably integral with the base is a yoke 4, the opening 5 of which is elongated, terminating at the upper end in a head 6. A carrier 7 is slidably mounted in the opening of the yoke, and comprises a bearing 8, to receive the rear or inner end of the fan shaft 9, and a block-like extension 10, rising from the bearing 8 and slidably held between the arms of the yoke.

A jack-screw 11 is mounted for free rotative movement in the head 6 of the yoke, and has its threaded end 12 arranged to cooperate with an internally threaded opening 13 extending longitudinally of the extension 10 of the carrier. Obviously appropriate operation of the jack-screw will raise or lower the carrier with respect to the yoke.

The improved means for adjusting the mounting is used in connection with the other details of the mounting as usually constructed, and such may be briefly described as follows: The fan shaft 9, which as before stated is in the present invention supported in the carrier 7, is secured, following the carrier adjustment, by terminal nuts 14, forcing clamping washers 15 into contact with the opposing sides of the yoke, these washers being loosely arranged on the fan shaft. The forward washer is drawn into clamping cooperation with the yoke in the endwise movement of the shaft, through a shoulder 16 on said shaft, the nuts 14 forcing the other washer into clamping action.

The fan proper 17 is mounted on the usual extension 18 of the belt pulley 19, ball bearings 20 being arranged between such belt pulley and a bushing 21 held on the fan shaft.

The improved fan mounting readily lends itself to a method of lubrication for the belt pulley, through which the pulley may be lubricated while the fan is in operation. The fan shaft is formed with a longitudinal bore 22, opening through the rear or inner end of the shaft in an enlargement threaded for the removable reception of a grease-cup connection. The forward end of the bore 22 is directed laterally, as at 23, opening on the surface of the fan shaft and preferably within a circumferentially reduced portion 24 of such shaft. A lubrication chamber is thus formed between the shaft and bushing, and the latter is formed with openings 25, through which the lubricant is delivered to reach the bearings.

With the improved mounting the clamping washers are loosened by loosening the nuts 14, whereupon the jack-screw 11 may be operated to move the carrier and thereby the fan shaft, fan, and belt pulley, until the desired tension is obtained on the belt. The nuts may then be tightened, securing the parts in the adjusted position.

Preferably, some means should be provided for securing the fan shaft against turning during the loosening and tightening of the nuts 14. An appropriate means for this purpose are contemplated, such being here conventionally illustrated as a set screw 26, cooperating with the threaded opening in the carrier, and engaging a recess formed in the shaft, as at 27.

It will be noted that the adjusting means for the fan shaft is wholly independent of the shaft proper, and that no openings or other weakening formations in the shaft are necessary. This tends to a more satisfactory mounting, as the shaft is not weakened, nor in the event of breakage of the adjusting means, does the shaft require renewal. Furthermore, the improved means, permits the arrangement of the operating member, wholly beyond interference from moving or related parts, thus allowing of the fan-belt adjustment while the fan is in operation with equal facility as when idle.

Having thus described the invention, what is claimed as new, is:—

1. A fan mounting comprising a yoke, a carrier slidable therein, means for adjusting the carrier with respect to the yoke, a fan shaft mounted in the carrier, means for moving of the fan shaft relatively to the carrier, and means operative in such movement of the fan shaft to secure the carrier against movement in the yoke.

2. A fan mounting comprising a yoke, a carrier slidable in the yoke, a fan shaft mounted in the carrier, means for adjusting the carrier longitudinally of the yoke, clamping washers on the fan shaft to engage opposite sides of the yoke, and means for moving the fan shaft to cause a clamping co-operation of said washers with the yoke.

In testimony whereof I affix my signature.

ALFONSO M. LEONI.